US005491322A

United States Patent [19]
Waligorski

[11] Patent Number: 5,491,322
[45] Date of Patent: * Feb. 13, 1996

[54] DRIP COFFEE MAKER FOR USE WITHIN A MICROWAVE OVEN

[75] Inventor: Gordon Waligorski, Delphi, Ind.

[73] Assignee: Farberware, Inc., Bronx, N.Y.

[ * ] Notice: The portion of the term of this patent subsequent to Mar. 12, 2008, has been disclaimed.

[21] Appl. No.: 638,914

[22] Filed: Jan. 9, 1991

Related U.S. Application Data

[62] Division of Ser. No. 310,447, Feb. 13, 1989, Pat. No. 4,999,466.

[51] Int. Cl.⁶ .................................................. H05B 6/80
[52] U.S. Cl. ................... 219/689; 99/302 R; 99/DIG. 14
[58] Field of Search .................... 219/689, 10.55 G, 219/10.55 F, 10.55 R, 10.55 M; 99/302 R, 281, 282, 306, 307, 308, 309, 310, DIG. 14, 451; 426/241

[56] References Cited

U.S. PATENT DOCUMENTS

| | | | |
|---|---|---|---|
| 2,365,269 | 12/1944 | Hill | 99/305 |
| 2,403,404 | 7/1946 | Scott | 99/302 |
| 2,601,067 | 6/1952 | Spencer | 99/292 |
| 3,570,390 | 3/1971 | Jordan et al. | 99/282 |
| 3,736,155 | 5/1973 | Martin | 99/282 |
| 3,757,670 | 9/1973 | Laama et al. | 99/302 |
| 3,793,934 | 2/1974 | Martin | 99/282 |
| 3,859,902 | 1/1975 | Neumann et al. | 99/304 |
| 4,104,485 | 8/1978 | Freedman et al. | 99/283 |
| 4,147,097 | 4/1979 | Gregg | 99/283 |
| 4,162,054 | 7/1979 | Hauslein | 248/94 |
| 4,381,696 | 5/1983 | Koral | 99/304 |
| 4,417,116 | 11/1983 | Black | 219/10.55 A |
| 4,527,467 | 7/1985 | Siemensma | 99/279 |
| 4,577,080 | 3/1986 | Grossman | 219/10.55 E |
| 4,642,443 | 2/1987 | Jorgensen et al. | 219/10.55 E |
| 4,721,835 | 1/1988 | Welker | 219/10.55 E |
| 4,739,696 | 4/1988 | Sheen | 99/279 |
| 4,756,915 | 7/1988 | Dobry | 426/234 |
| 4,785,723 | 11/1988 | Sheen | 99/279 |
| 4,815,366 | 3/1989 | Hauslein | 99/283 |
| 4,819,553 | 4/1989 | Heyn et al. | 99/305 |
| 4,900,886 | 2/1990 | Bridges | 219/689 |
| 4,908,222 | 3/1990 | Yu | 219/689 |
| 4,999,466 | 3/1991 | Waligorski | 219/689 |

FOREIGN PATENT DOCUMENTS

| | | | |
|---|---|---|---|
| 506346 | 10/1951 | Belgium . | |
| 747411 | 6/1933 | France . | |
| 2500288 | 8/1982 | France . | |
| 926087 | 4/1955 | Germany . | |
| 2600018 | 7/1977 | Germany . | |
| 2628735 | 12/1977 | Germany . | |
| 63-299088 | 12/1988 | Japan | 219/689 |
| 7807403 | of 0000 | Netherlands . | |

*Primary Examiner*—Philip H. Leung
*Attorney, Agent, or Firm*—Seidel Gonda Lavorgna & Monaco

[57] ABSTRACT

The invention includes a brewing apparatus which makes coffee, tea or the like by the drip method within a microwave oven. The brewing apparatus includes a reservoir for retaining a quantity of water for heating which is positioned on a carafe for receiving a quantity of brewed coffee, tea or the like therein. A basket supported on the reservoir retains coffee grounds, tea leave or the like while permitting brewed material to pass therethrough. A pump tube is attached to the reservoir and extends into the cavity formed thereby to a position below the water line. The reservoir is formed such that the application of microwave energy heats the water within the cavity, causing a pressure increase. The pressure forces liquid through the inlet of the pump tube. The pump tube direct the heated water through the outlet onto the coffee grounds, tea leaves or the like within the basket. The brewed material then passes from the basket into the carafe. The reservoir may be removed from the top surface of the carafe and the coffee, tea or the like served therefrom.

13 Claims, 4 Drawing Sheets

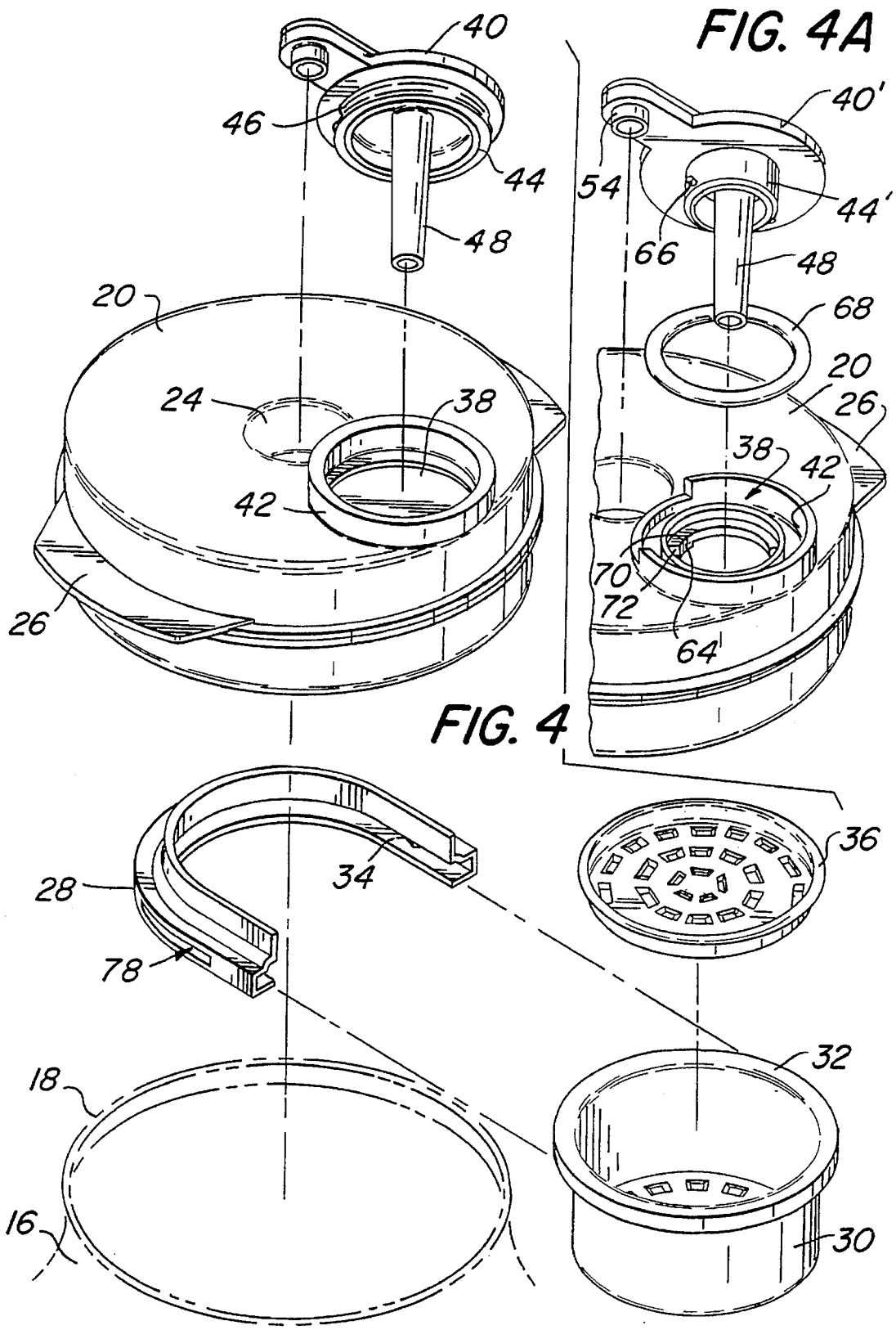

DRIP COFFEE MAKER FOR USE WITHIN A MICROWAVE OVEN

This is a division of application Ser. No. 07/310,447, now U.S. Pat. No. 4,999,466, filed Feb. 13, 1989.

BRIEF DESCRIPTION OF THE INVENTION

The present invention relates to a coffee brewing apparatus which makes coffee by the drip method. Particularly, the invention is for brewing drip coffee within a microwave oven. The brewing apparatus retains a quantity of water during heating by the microwave energy, substantially continuously pumps the heated water onto coffee grounds within a basket and deposits the brewed coffee into a carafe.

BACKGROUND OF THE INVENTION

Previous apparatus to make "microwave coffee" either use the percolation method (U.S. Pat. No. 4,642,443), or control the deposit of heated water onto the coffee grounds by a temperature sensitive valve (U.S. Pat. No. 4,104,957, No. 4,381,696 and No. 4,132,239.) These valve controlled microwave coffee makers are adapted to open at a predetermined temperature when heated by the water retained in a reservoir. Upon opening of the valve, the entire quantity of water retained within the reservoir is deposited onto the coffee grounds.

SUMMARY OF THE INVENTION

A preferred embodiment of the present invention includes a drip style coffee brewing apparatus which operates within a microwave oven. The coffee making apparatus is preferably positioned on a carafe forming a base or support. A water reservoir forms a lid for the carafe and retains a quantity of water within a cavity for heating by the microwave energy. A pump tube is provided on the reservoir and seals the cavity from ambient air. The pump tube inlet extends into the reservoir to a position below the water line, closely adjacent the bottom surface of the cavity. The pump tube outlet is positioned above a basket retaining coffee grounds. The basket is supported on the reservoir above the opening into the carafe. The basket includes a perforated bottom surface adapted to retain coffee grounds while permitting brewed coffee to pass into the carafe. The basket may also include a perforated lid to distribute the flow of water deposited thereon. The basket is made of metal in order to shield the coffee grounds from the microwave energy during the brewing cycle.

The above described apparatus brews coffee according to the following steps. The reservoir is filled with the quantity of water intended to be brewed into coffee. A corresponding amount of coffee grounds is placed within the basket and the basket is positioned on the reservoir. The pump tube is placed into the cavity and seals the water in the reservoir. The reservoir is placed on top of the carafe and supported thereby. The carafe and reservoir are inserted into the cavity of the microwave oven and exposed to the microwave energy therein. The microwave energy acting on the water within the sealed cavity of the reservoir causes the fluid to heat and increases the pressure within the cavity. The pressure increase is such that water is cyclically pumped from the cavity through the pump tube. The pump tube directs the water through its outlet onto the lid of the coffee basket. The heated water flows into the basket and onto the coffee grounds. The heated water partially dissolves the coffee grounds to brew coffee. The brewed coffee passes through the perforated bottom surface of the basket and is collected within the carafe. The carafe is removed from the microwave oven upon transfer of substantially all the water from the cavity. The reservoir is removed from the top of the carafe and the coffee is served. Other features of the invention will become apparent by describing a preferred embodiment thereof.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 4 is an exploded view thereof.

FIG. 4A is an exploded view of an alternate embodiment thereof.

DETAILED DESCRIPTION OF THE DRAWINGS

Figure 1:
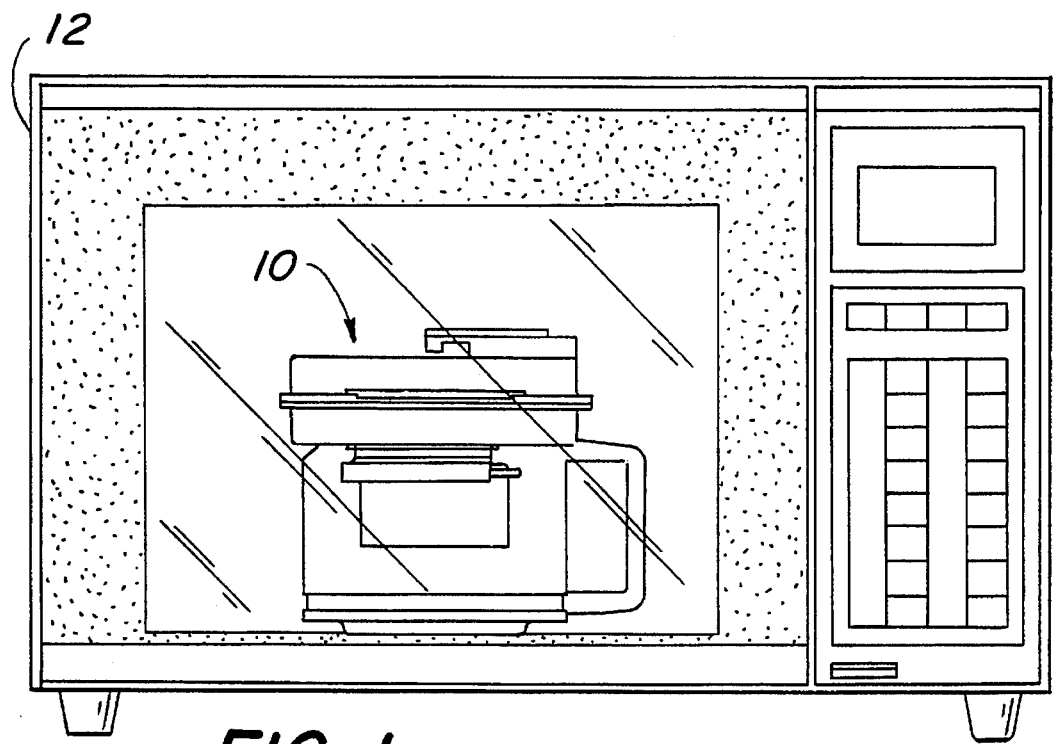
FIG. 1 shows the invention retained within the cavity of a typical microwave oven.

In the figures where like numerals indicate like elements there is shown the coffee brewing apparatus 10 of the type preferred by the present invention. FIG. 1 illustrates the apparatus positioned within the cavity of a microwave oven 12. The microwave oven 12 is contemplated to be of any type available on the market. However, a microwave oven of at least 600 watts is preferred for conveniently brewing approximately 6 cups of coffee, i.e., 30–36 ounces (65 cubic inches) of water. Lower wattage units may drastically effect the time to sufficiently heat the water for brewing, and thus extend the brewing cycle.

Figure 2:
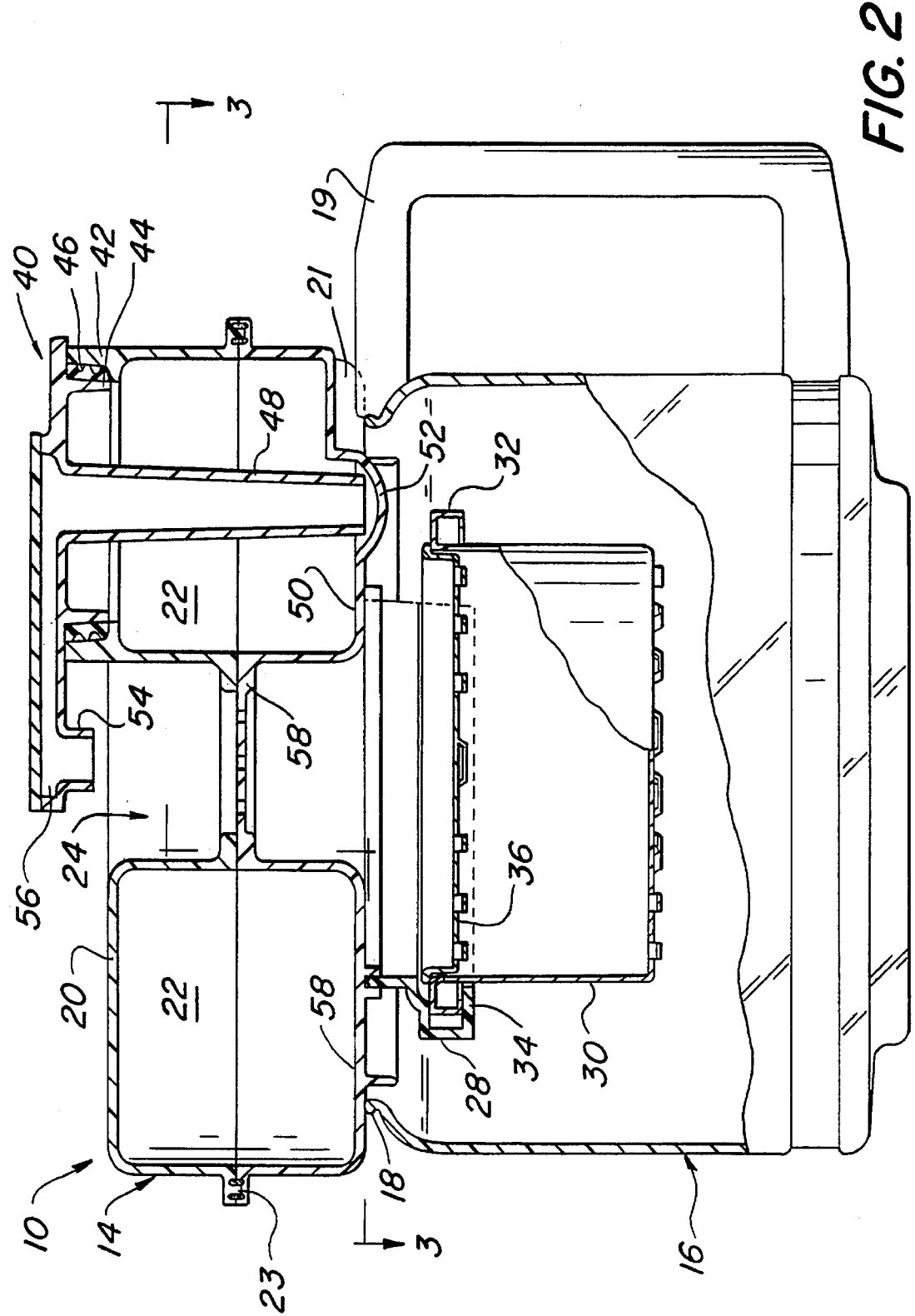
FIG. 2 is a side cross-sectional view of the preferred embodiment of the invention.
Figure 3:
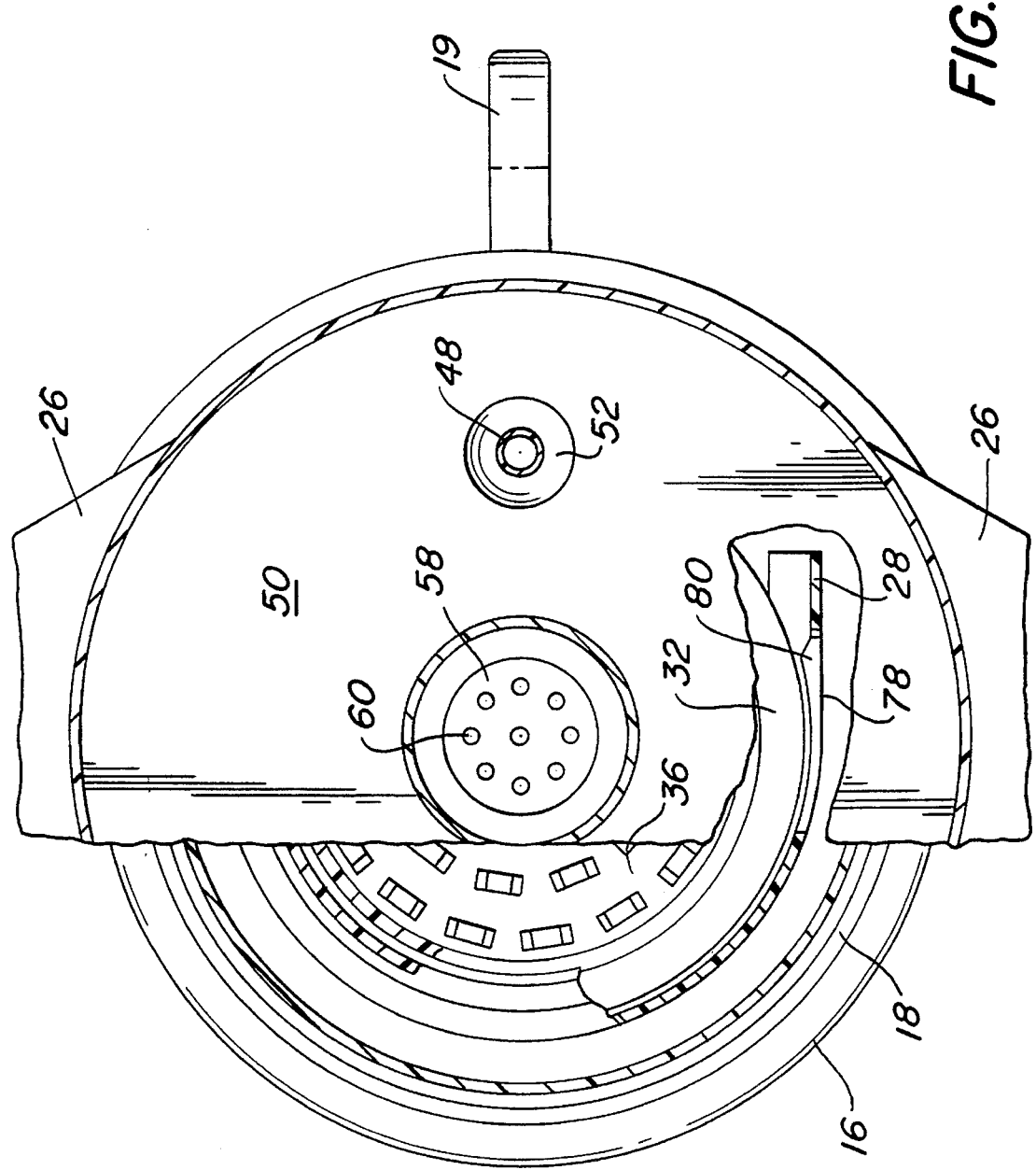
FIG. 3 is a top cross-sectional view thereof.

As particularly illustrated in FIGS. 2, 3 and 4, the apparatus 10 generally comprises a reservoir portion 14 which is adapted to be positioned on and supported by a vessel such as a carafe 16. The reservoir 14, as shown, is supported on the upper rim 18 of the carafe 16 with portions extending into the carafe 16. The carafe 16 is generally contemplated to be made of a microwave pervious or transparent material. Additionally, it is preferred that the carafe 16 be translucent or transparent so that the brewed coffee may be viewed through the side walls thereof.

The carafe 16 includes a handle 19 which is attached to the side walls thereof. The handle 19 may be attached to the carafe 16 in any manner desired. However, if the handle 19 is attached by use of a metal band or includes metal portions, the method of attachment must contemplate the fact that adjacent metal surfaces may cause arcing within the oven when exposed to microwave energy. The top portion of the handle 19 is contemplated to be attached to the carafe 16 adjacent to the upper rim 18 thereof. As illustrated, a cavity 21 is provided adjacent the bottom surface of the reservoir 14 so as to permit the reservoir 14 to be seated on the rim 18 while remaining level. The cavity 21 provides clearance for the attachment of the handle 19 to the rim 18.

The reservoir 14 preferably includes a tubular or donut shaped body portion 20 defining an enclosed tubular cavity 22. A central opening or passageway 24 is provided through the middle of the body 20. Attached to the body 20 are handles 26 positioned at any convenient location on the side walls thereof for lifting the reservoir 14 off of the carafe 16 when the brewed coffee is to be poured. The handles 26 may either be molded as part of the body 20 or may be attached by a solvent or ultrasonic welding to the side walls.

The reservoir portion 14 may be formed by any convenient method as desired. These methods include blow molding of the entire structure or the joinder of an upper and lower portion by means of ultrasonic welding. As shown in FIG. 2, the reservoir 14 is formed from an upper and lower portion having a projecting rim 23 around the entire periphery of the body 20. The rim 23 is formed from typical vibration welding joints having a male and female portion. The structures of these joints are not contemplated to be a portion of the present invention other than forming the reservoir body 20 and sealing the side walls of cavity 22.

Attached to the bottom surface of body 20 is a shelf 28 generally having a U-shape. The shelf 28 is adapted to receive a coffee basket 30 within the open end thereof and support the basket 30 from the bottom surface of the body 20. The coffee basket 30 as shown includes an outwardly projecting rim 32 which rests on inwardly projecting surfaces 34 of shelf 28. The coffee basket 30 is slid onto surface 34 such that the basket 30 is positioned substantially in alignment with opening 24. Spring fingers 78 which are cantilevered, flexible portions within the walls of the shelf 28 are provided adjacent surface 34 at the ends of the U-shape. The spring fingers 78 may include inwardly projecting tabs 80 so as to retain the basket 30 and lid 36 within the shelf 28 during movement of the reservoir 14.

The reservoir 14 and its constituent parts are preferably made of a microwave transparent material, such as polycarbonate. Other microwave transparent materials, such as polypropylene, may also be used. However, the reservoir 14 of the present apparatus 10 is contemplated to be positioned close to the magnetron outlet of the microwave oven 12. Therefore, the reservoir material will be subjected to a high rate of microwave energy, since less scattering will have taken place upon first introduction into the oven cavity. This positioning of the reservoir 14 will heat the water at a faster rate, reducing brewing time. However, the more durable material under these conditions is the polycarbonate and such is preferred.

The basket 30 is preferably made of metal, such as stainless steel, or other microwave impermeable material. It is desired that the basket or other structure shield the coffee grounds from microwave energy during brewing to prevent burning thereof. The basket 30 preferably includes a lid 36 which rests on the inside or top surface of the rim 32. The lid 36 may also be microwave impermeable, but is preferably made of a microwave transparent material. If the lid 36 is made of metal, caution must be taken since contact or positioning in close proximity of the metal basket rim 32 with other metal surfaces may cause the materials to arc when microwave energy is applied. Arcing may cause the surfaces of the basket 30 to deteriorate and/or create heat, causing deformation of the shelf 28 such that it will no longer support the basket 30. Where the lid 36 is made of a microwave permeable material, the water within the reservoir 14 will act as a microwave shield for the coffee grounds within the basket 30. This is due to the fact that microwave energy acts on water, vegetable and mineral in that order. The mass of the water in the reservoir 16 will absorb the microwaves directed toward the top of the basket 30 during heating until the water has been transferred through the brewing cycle.

On the top of body 20 is provided an opening 38. Inserted within the opening is pump tube 40. Opening 38 includes a projecting rim 42. Pump tube 40 includes a surface 44 which is intended to mate with rim 42. A gasket 46 is positioned on surface 44 and is intended to engage the internal surface of the rim 42 so as to seal the cavity 22 and retain the pump tube 40 within the opening 38 during brewing.

Pump tube 40 includes an inlet tube 48 which extends through the opening 38 and into cavity 22. The bore of tube 48 is preferably ⅜ inch in diameter. This dimension may vary, however, depending on the desired flow rate to be passed through the pump tube 40. Inlet tube 48 communicates with an outlet tube 54 through passageway 56. Outlet tube 54 is positioned directly above the opening 24 through the center of the body portion 20. The conduit formed by the pump tube 40 via the inlet tube 48, passageway 56 and outlet tube 54 is not required to be sealed with respect to the ambient air. However, it is preferred that the pump tube 40 direct the fluid from the inlet 48 to the outlet 54 without spillage.

Tube 48 preferably extends to a position closely adjacent the internal bottom surface 50 of the body 20. Within the cavity 22, is provided a well 52 which extends slightly below the bottom surface 50 such that the inlet 48 for pump tube 40 maybe located at a level below bottom surface 50. Thus the inlet 48 will be below the water line until substantially all of the fluid is removed from the reservoir 14. The bottom surface 50 may also be drafted so as to angle towards the well 52 within the cavity 22.

Figure 5:
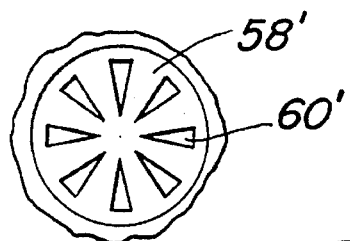
FIG. 5 is an alternate embodiment of the spreader plate portion of the invention.
Figure 6:
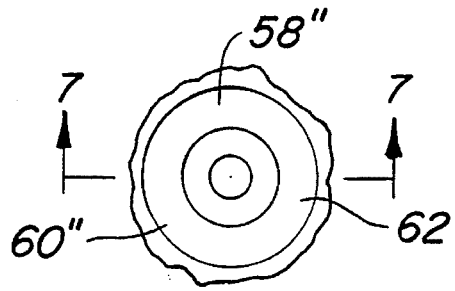
FIG. 6 is a second alternate embodiment of the spreader plate portion of the invention.
Figure 7:
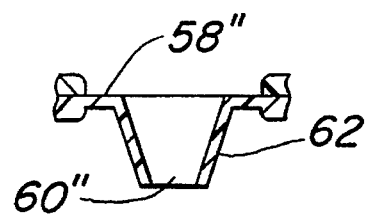
FIG. 7 is a cross-sectional view of the spreader plate of FIG. 6.

The outlet 54 of pump tube 48 is preferably positioned above a spreader plate 58 within opening 24. Fluid flow passing through the outlet 54 will be deposited onto the spreader 58 and its flow will be restricted thereby prior to being deposited onto the lid 36 of the basket 30. As shown in FIG. 3, the spreader plate 58 includes a series of circular openings 60 to restrict the flow to the lid 36. Alternate embodiments of the spreader are illustrated in FIGS. 5, 6 and 7. FIG. 5 generally shows a spreader 58' having triangular shaped slots 60' extending radially about the center. This spreader embodiment 58' of FIG. 5 is generally contemplated for use in making tea or the like by replacing the coffee grounds in the basket 30 with tea leaves. The greater restriction of flow formed by the slots 60' in spreader plate 58' is sufficient to properly brew the tea which has a preferred flow pattern and flow rate different from that for brewing coffee. The spreader embodiment 58" shown in FIGS. 6 and 7 includes a single opening 60" having a generally tapered surface 62 extending downwardly towards the coffee basket 30. It is contemplated that any of these spreader plate embodiments could be provided as interchangeable inserts which may be inserted into the opening 24 in the reservoir body 20 and replaced as desired. As shown, the spreader plates are formed as part of the body portion 20.

The lid 36 may also include means for restricting the water flow to the coffee grounds within the basket 30. The surface of the lid 36 is preferably the same as that on the bottom surface of the basket 30. These surfaces include a series of generally rectangular slots or lanced louvers which are arranged in a uniform pattern. These slots are approximately ¼×⅛ inches in dimension and form openings at the bottom of approximately 0.026 inches in height. Slots of this size and form permit the fluid to pass through the surface without the coffee grounds or the like also passing therethrough. This type surface is generally contemplated to meet the requirements of the coffee industry for retaining water on the grounds within the basket for properly brewed coffee. However, other surface configurations or a basket using a filter is also contemplated by the present invention.

FIG. 4A shows an alternate embodiment of the pump tube 40'. Pump tube 40' is attached to the body 20 by means of a locking wedge 64 on the inside surface of the opening 38 and projecting tabs 66 on the outside of surface 44'. Additionally, an O-ring 68 is provided between an inwardly projecting shoulder 70 and the top portion of the pump tube 40'. The shoulder 70 forms a seat for the O-ring 68 upon positioning of the pump tube 40' within the opening 38. The pump tube 40' is inserted into the opening 38 with the projecting tabs 66 moving through slots or breaks 72 in the shoulder 70. The tabs 66 when positioned below the bottom surface of the shoulder 70 are rotated, along with the outlet end 54 of the pump tube 40', so as to move under the locking wedge 64. This rotation and locking action places the O-ring seal 68 in compression against the shoulder 70, the rim 42 and the pump tube 40' and seals the cavity 22. Release of the pump tube 48' from this locked position is caused by depression of the pump tube 40' against the resilient biasing of the O-ring 68. Tabs 66 are rotated underneath the locking wedge 64 and released through slot 72.

The operation of the apparatus 10 is generally contemplated to be as follows. First, the pump tube 40 is removed from the opening 38 and water is poured into cavity 22. The pump tube 40 is replaced within the opening 38 with the gasket 46 (or O-ring 68) forming a seal between surface 44 and the projecting rim 42. The inlet 48 of the pump tube 40 extends below the water line within the cavity 22 with its end positioned closely adjacent the bottom surface 50 of the reservoir 14 and preferably within well 52. Coffee grounds are placed within the basket 30 and the lid 38 is placed over the grounds. The basket 30 is then slid onto the shelf 34, retained by spring fingers 78 and thereby supported below the body 20. The reservoir 14 is then placed on top of the carafe 16 such that the basket 30 is positioned within the interior of the carafe 16 and the reservoir 14 rests on the upper rim 18. The apparatus 10 is then placed into the cavity of the microwave oven 12 with the oven being set for operation.

Upon exposure of the microwave energy to the apparatus 10, the water within the cavity 22 is heated. The heating of the water increases the pressure within the cavity 22. This increase in pressure causes water to be forced upwardly through the inlet tube 48 and through passageway 56, and to be expelled from outlet tube 54. Outlet tube 54 directs the heated water onto the spreader plate 58. The water passes through the openings 60 in the spreader 58, onto the lid 36 and then onto the coffee grounds within the basket 30. As the coffee grounds are exposed to the heated water, the grounds partially dissolve and coffee is brewed. The brewed coffee then passes through the bottom of the basket 30 and into the carafe 16. It is preferred that the carafe 16 be sized such that the level of the brewed coffee fills only to a position below the bottom surface of the coffee basket 30.

The change in pressure caused by the heating of the water within the sealed cavity of the reservoir body 20 is contemplated to fluctuate cyclically over the heating cycle due to the disbursement of water through the outlet tube 54 and the associated reduction in water mass within the cavity 22. However, the movement of the water through the pump tube 40 is contemplated to be sufficient to provide a substantially constant flow onto the coffee grounds and sufficient to pump nearly all of the water from the cavity 22.

It is generally contemplated that 5 to 6 cups of coffee, that is 30 to 36 ounces of water, can be brewed in 5-6 minutes by a microwave oven having 1,000 watts. The donut or tubular shaped reservoir body 20 is designed to increase the surface area of exposure of the microwave energy so as to maximize the heating of the water. Upon transfer of all water from the reservoir 14, through the brewing cycle and into the carafe 16 the apparatus 10 is removed from the oven 12. The reservoir 14 is taken off of the rim 18 of the carafe 16 and the coffee served. Handles 26 are provided on the reservoir 14, since the heated water may cause the reservoir material to heat during brewing. However, since the material of the reservoir 14 and the remaining portions thereof are preferably contemplated to be microwave permeable, the microwave energy does not substantially heat the material being used.

It is also contemplated that the apparatus of the present invention may be pressurized such that the brewing process would be capable of preparing Espresso. Such would be accomplished by sealing the outlet tube 54 with respect to passageway 24 within body portion 20.

The present invention may be embodied in other specific forms without departing from the spirit or essential attributes thereof and, accordingly, reference should be made to the appended claims, rather than to the foregoing specifications, as indicating the scope of the invention.

I claim:

1. An apparatus for use within a microwave oven, comprising: a reservoir defining a closed chamber for retaining a quantity of water for heating by microwave energy, a carafe for receiving a quantity of heated water, pump tube means removably attached to the reservoir, the pump tube means having an inlet and an outlet end, the inlet end extending into the reservoir to a position adjacent the bottom surface of the chamber, the attachment of the pump tube means to the reservoir sealing the chamber from ambient air pressure, a basket having a perforated bottom surface supported below the outlet end of the pump tube means, whereby the microwave energy of the oven is directed onto the water retained in the reservoir, heating the water, the heating of the water in the closed, sealed chamber of the reservoir means over time increasing vapor pressure within the reservoir, the pressure increase forcing the heated water through the inlet end of the pump tube means and to be discharged from the outlet end, the water passing through the basket and into the carafe positioned below the basket.

2. An apparatus for heating water therein by the application of microwave energy and for dispensing the heated water, comprising:

a reservoir for receiving water to be heated, the reservoir defining a closed chamber and a filling aperture for introducing water into the chamber;

conduit means having an inlet end and an outlet end, the inlet end extending into the reservoir to a position adjacent the bottom surface of the chamber, the conduit means being removably attached to the reservoir, the attachment of the conduit means to the filling aperture sealing the chamber from ambient air pressure, the reservoir being substantially transparent to microwave energy such that, upon exposure of the apparatus to microwave energy, water in the closed, sealed chamber is heated, increasing overtime the vapor pressure within the reservoir, the pressure increase forcing water through the inlet end of the conduit means to be discharged from the outlet end of the conduit means.

3. An apparatus as claimed in claim 2 wherein the conduit means defines an inverted, substantially U-shaped passageway.

4. An apparatus as claimed in claim 3 wherein the outlet end of the conduit means is vertically above the inlet end of the U-shaped passageway.

5. A microwave brewing apparatus for use within a microwave oven for brewing a heated beverage by contacting a brewing material with water heated by application of microwave energy, the apparatus comprising: reservoir means defining a chamber for retaining a quantity of water to be heated, a carafe adapted to receive a quantity of brewed beverage, pump tube means having an inlet end extending into the reservoir means to a position adjacent the bottom of the chamber and an outlet end, retaining means for retaining a quantity of brewing material, the retaining means positioned below the outlet end of the pump tube means and above the carafe, and means for sealing the chamber defined by the reservoir means from ambient air pressure, whereby water within the chamber is heated by application of microwave energy is forced from the reservoir into the inlet end of the pump tube means and is discharged from the outlet end of the pump tube means into the retaining means by an increase in vapor pressure within the chamber created by the heating of the water by the microwave energy, the retaining means adapted to receive the heated water from the outlet end and direct the heated water into contact with brewing material therein and brewing a beverage therefrom, the retaining means further adapted to discharge brewed beverage into the carafe while retaining the brewing material therein.

6. A microwave brewing apparatus as claimed in claim 5 wherein the pump tube means is removably attached to the reservoir means.

7. A microwave brewing apparatus as claimed in claim 5 wherein the brewing material is tea.

8. A microwave brewing apparatus as claimed in claim 7 wherein the tea is retained in a tea bag.

9. A method of making a beverage in a microwave oven, which employs an apparatus having a microwave transparent pressurizable liquid reservoir disposed above a filter basket adapted to hold a quantity of brewing material, the reservoir and the filter basket adapted to be placed over a beverage receiving carafe, the reservoir being in fluid communication with the filter basket through a pressure overflow transfer means, the method comprising:

pouring a liquid into the liquid reservoir to a level not exceeding the overflow level of the transfer means;

placing a supply of brewing material in the filter basket;

positioning the reservoir over said filter basket and placing the reservoir and the filter basket over the carafe;

closing the reservoir;

heating the liquid in the reservoir with microwave energy to raise the liquid vapor pressure in the reservoir sufficiently to force the liquid from the reservoir through the pressure overflow transfer means and into the filter basket to make a beverage; and collecting the beverage in the carafe.

10. The method of claim 9 wherein the liquid is water.

11. A beverage brewing apparatus for use in a microwave oven, adapted to be placed over a beverage receiving carafe having an open end, comprising:

a filter basket adapted for holding a quantity of brewing material and for dispensing a brewed beverage therefrom into the carafe;

a pressurizable microwave transparent reservoir adapted to hold a quantity of liquid up to a predetermined level, the reservoir positioned generally above the filter basket; and pressure overflow transfer means through which the reservoir is in fluid communication with the filter basket and which is adapted to hold the liquid within the reservoir until the pressure in the reservoir rises sufficiently to force the liquid at least partially through the overflow means into the filter basket.

12. The apparatus as claimed in claim 11 wherein the pressure overflow transfer means comprises an overflow conduit which connects the reservoir with the filter basket, the upper end of the overflow passageway being disposed above the predetermined liquid level in the reservoir, and an inlet passageway having an open lower end extending adjacent the bottom of the reservoir.

13. The apparatus as claimed in claim 11 wherein the liquid is water.

* * * * *